United States Patent
Fenchel et al.

(10) Patent No.: US 6,192,867 B1
(45) Date of Patent: Feb. 27, 2001

(54) METHOD AND DEVICE FOR PROTECTING A TURBO-SUPERCHARGER

(75) Inventors: Reinhard Fenchel, Calw-Altenburg; Thomas Rueping, Lenningen, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/355,043

(22) PCT Filed: Mar. 13, 1998

(86) PCT No.: PCT/DE98/00744

§ 371 Date: Jul. 22, 1999

§ 102(e) Date: Jul. 22, 1999

(87) PCT Pub. No.: WO99/04150

PCT Pub. Date: Jan. 28, 1999

(30) Foreign Application Priority Data

Jul. 17, 1997 (DE) .............................. 197 30 578

(51) Int. Cl.⁷ .......................... F02D 23/02; F02D 41/22; F02D 41/32

(52) U.S. Cl. ..................... 123/486; 60/603; 123/198 D

(58) Field of Search .................. 123/198 D, 198 DB, 123/357, 358, 383, 478, 481, 486, 494; 60/603

(56) References Cited

U.S. PATENT DOCUMENTS

| 4,434,761 | * | 3/1984 | Ludwig | 123/383 |
| 4,633,670 | * | 1/1987 | Iwasa | 60/603 |
| 5,205,261 | * | 4/1993 | Betts, Jr. et al. | 123/494 |
| 5,913,301 | * | 6/1999 | Kienle et al. | 123/481 |
| 6,026,784 | * | 2/2000 | Weisman et al. | 123/352 X |

\* cited by examiner

*Primary Examiner*—Tony M. Argenbright
(74) *Attorney, Agent, or Firm*—Michael J. Striker

(57) ABSTRACT

In order for the process and the device to function with as small as possible a number of sensors for operating parameters, a program map (20) is provided from which the intake air pressure (AL) of the charger (3, 5) is derived as a function of the charging pressure (PL), the engine speed (n), and a fuel quantity preset (QK) corresponding to the accelerator position, and there is a device (21) which determines a limit value (QKG1) for the fuel quantity (QK') metered to the engine (1) as a function of the intake air pressure (AL).

6 Claims, 1 Drawing Sheet

METHOD AND DEVICE FOR PROTECTING A TURBO-SUPERCHARGER

BACKGROUND OF THE INVENTION

The current invention relates to a process and a device for protecting a turbocharger of an internal combustion engine against being destroyed by an excessive charger speed.

As can be seen from MTZ, Motortechnische Zeitschrift [Motor Technology Journal], 53 (1992) 10, pp. 454 to 462, with increasing altitude and therefore decreasing ambient pressure, i.e. decreasing air pressure, the required charging pressure of a turbocharger is only achieved with an increase in the charger speed. To this end, the waste-gate on the exhaust side of the turbocharger is more closed and consequently, the turbine is acted on with a larger quantity of exhaust. However, so that decreasing ambient pressure does not lead to an excessive increase in the charger speed, which would destroy the turbocharger, the atmospheric pressure is measured with the sensor and the charging pressure reference value for the regulation is reduced as a function of this.

According to DE 43 02 339 A1, the maximum permissible fuel quantity to be injected is predetermined based on operating parameters such as temperature and pressure. In an internal combustion engine equipped with a charger, preferably a self-igniting engine, the charging air temperature is predetermined based on the ambient temperature, the atmospheric pressure, and the charging pressure.

SUMMARY OF THE INVENTION

The object of the invention is to disclose a process and a device of the type mentioned the beginning, which operate with as small as possible a number of sensors for detecting operating parameters, from which a protective function for the turbocharger can be derived.

The above-mentioned object is attained by virtue of the fact that the intake air pressure of the charger is derived from a program map which is a function of the charging pressure, the engine speed, and the fuel quantity preset corresponding to the accelerator position, and that as a function of this intake air pressure, a limit value is determined for the fuel quantity metered to the engine. Therefore, no sensor is required for the intake air pressure, since this is derived based on other operating parameters from a program map. The fact that the reduction of the intake air pressure does not cause the turbocharger to exceed its critical speed, is achieved by virtue of the fact that a limitation of the fuel quantity metered to the engine is carried out as a function of the intake air pressure. Reducing the fuel quantity decreases the overall energy in the exhaust conduit prevailing on the turbine of the turbocharger. As result, the critical turbocharger speed is not reached. Therefore with this function, the turbocharger is protected against being destroyed by exceeding its critical speed due to a decreasing intake air pressure, which can occur, for example, as a result of a drop in the atmospheric pressure (during a drive in the mountains) or also due to a contamination of the air filter.

If, according to further embodiments, the atmospheric pressure is additionally measured upstream of an air filter, which is disposed in the air intake conduit upstream of the charger, then the difference between the measured atmospheric pressure and the intake air pressure can be used to determine whether there is a contamination of the air filter.

BRIEF DESCRIPTION OF THE DRAWINGS

The invention will be explained in detail below in conjunction with an exemplary embodiment shown in the drawings.

DESCRIPTION OF PREFERRED EMBODIMENTS

Figure 1:
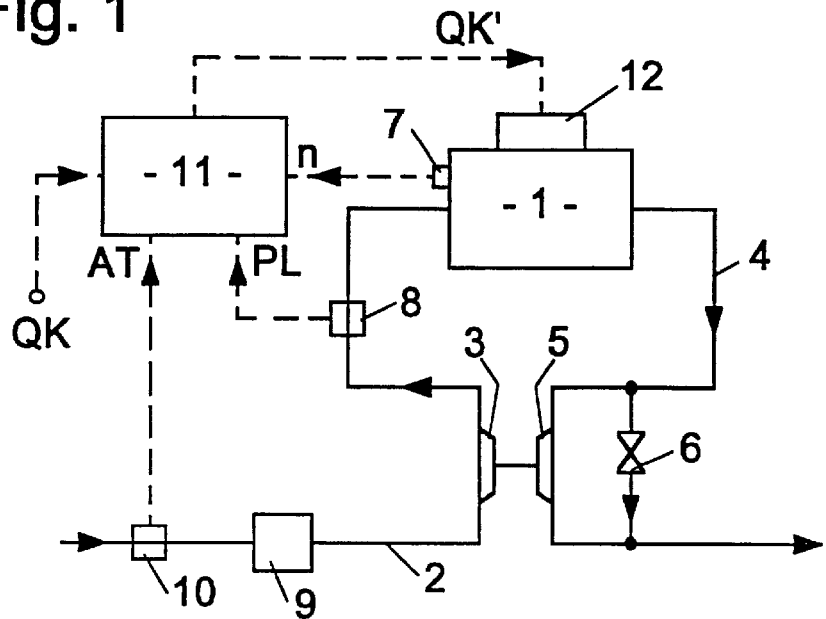
FIG. 1 shows a block circuit diagram of an internal combustion engine with a turbocharger and FIG. 2 shows a function diagram, which is present in a control device and is for limit the speed of the turbocharger.

As can be inferred from the principal block circuit diagram in FIG. 1, an internal combustion engine 1—preferably a self-igniting engine—has a compressor 3 in its intake conduit 2 and has a turbine 5 of an exhaust gas turbocharger in its exhaust conduit 4. A bypass valve 6 is inserted in a bypass conduit of the turbine 5 and is used for a regulation or control of the charging pressure, which is not described in detail here. A sensor 7 for measuring the engine speed n is disposed on the engine. A sensor 8 for detecting the charging pressure PL is disposed in the intake conduit 2 on the pressure side of the compressor 3. An air filter 9 and upstream of it, a sensor 10 for measuring the atmospheric pressure AT, are disposed in the intake conduit 2 on the intake side of the compressor 3. Besides the above-mentioned quantities—engine speed n, charging pressure PL, atmospheric pressure AT—, the fuel quantity preset QK corresponding to the accelerator position, is also supplied to a control device 11. As will be explained in more detail in conjunction with FIG. 2, based on all of the operating parameters mentioned at the beginning, the control device 11 determines a limited, metered fuel quantity QK', which is supplied to an injection device 12.

Figure 2:
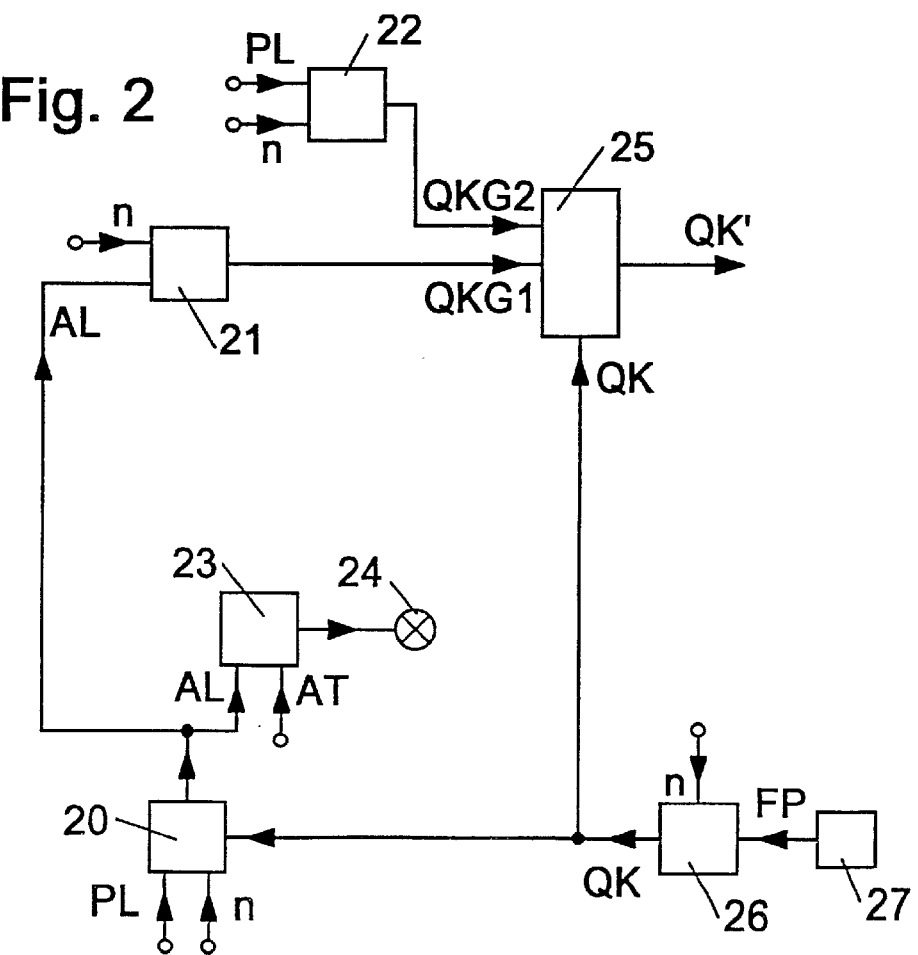

As shown in FIG. 2, a program map 20 is disposed in the control device and the intake air pressure AL between the air filter 9 and the compressor 3 of the turbocharger is derived from this program map 20, as a function of the charging pressure PL, the engine speed n, and a fuel quantity preset QK corresponding to the accelerator position. This intake air pressure AL, which is not determined by means of measurement, is supplied to another program map 21, in which a first limit value QKG1 for the fuel quantity to be metered to the engine is determined as a function of the intake air pressure and the engine speed n. A change in the atmospheric pressure affects the level of the intake air pressure, for example when driving up a mountain. In addition, a contamination of the air filter will lead to a decrease in the intake air pressure. If the fuel quantity is now metered as a function of the intake air pressure, the turbocharger is thus also protected from an excessive speed due to an air filter contamination.

If the internal combustion engine is a self-igniting engine, then a smog limiting program field 22 is provided, from which a second limit value QKG2 for the fuel quantity to be metered is derived as a function of the charging pressure PL and the engine speed n.

In a switching block 23, the difference is calculated between the intake air pressure AL downstream of the air filter 9, which is read from the program map 20, and the atmospheric pressure AT, which is measured upstream of the air filter 9 in the intake conduit 2. If this difference exceeds a particular limit value, then it is assumed that the air filter is contaminated. If the preset limit value for the difference between the intake pressure AL and the atmospheric pressure AT is exceeded, the switching block 23 triggers an optical signal display 24 in the vehicle.

The two above-described limit values QKG1 and QKG2 for the fuel quantity metered to the engine, together with fuel quantity preset QK due to the accelerator position, are supplied to a switching block 25 for the minimal selection.

The fuel quantity preset QK is calculated in a switching block 26 as a function of the engine speed n and the output signal FP of an accelerator position transmitter 27. The output signal QK', which controls the injection device 12 of the engine 1, is then oriented depending on which of the three input values QKG1, QKG2, and QK of the switching block 25 requires the least fuel quantity to be metered.

In the fuel metering, the device described therefore not only takes into account a drop in the atmospheric pressure, but also takes into account the smog output as well as a contamination of the air filter. The three protective functions mentioned above reduce to a very large extent the danger that the turbocharger will be destroyed due to an excessive speed. However, all three protective functions do not have to be used together in every instance.

What is claimed is:

1. A device for protecting a turbocharger of an internal combustion engine from being destroyed due to an excessive charger speed, comprising a program map (20), from which the intake air pressure (AL) of the charger (3, 5) can be derived as a function of the charging pressure (PL), the engine speed (n), and a fuel quantity present (QK) corresponding to the accelerator position (FP), and means (21) which determine a limit value (QKG1) for the fuel quantity (QK') metered to the engine (1) as a function of the intake air pressure (AL).

2. The device according to claim 1, further comprising a pressure sensor (10) which measures the atmospheric pressure (AT) upstream of an air filter (9) that is disposed in the air intake conduit (2) upstream of the charger (3), and means (23, 24), which calculate the difference (DI) between the measured atmospheric pressure (AT) and the intake air pressure (AL) and, when the difference (DI) exceeds a threshold value, signal a contamination of the air filter (9).

3. Process for protecting a turbocharger of an internal combustion engine from being destroyed due to excessive charger speed, comprising the steps of deriving an intake air pressure (AL) of a charger (3, 5) from a program map (20) which is a function of a charging pressure (PL), an engine speed (N), and a fuel quantity pre-set (QK) corresponding to an accelerator position (FP); and determining a limit value (QKG1) for the fuel quantity (QK') metered to the engine (1) as a function of this intake air pressure (AL).

4. Process according to claim 3, comprising a further step of deriving a second limit value (QKG2) for the fuel quantity (QK') from a smog limiting program map (22) that is a function of the charging pressure (PL) and the engine speed (N).

5. Process according to claim 3, comprising a further step of measuring an atmospheric pressure (AT) upstream of an air filter (9) which is disposed in an air intake conduit (2) upstream of the charger (3), calculating the difference (DI) between the measured atmospheric pressure (AT) and an intake air pressure (AL) in order to detect a contamination of the air filter (9).

6. Process according to claim 4, comprising a further step of making a minimal section (25) for the fuel quantity (QK') based on the fuel quantity pre-set (QK) and at least one of the two limit values (QKG1, QKG2) derived from the intake air pressure program map (21) and the smog limiting program map (22).

* * * * *